United States Patent
Uhm et al.

(10) Patent No.: US 12,327,874 B2
(45) Date of Patent: Jun. 10, 2025

(54) PACKAGING FOR FLEXIBLE SECONDARY BATTERY, AND FLEXIBLE SECONDARY BATTERY COMPRISING SAME

(71) Applicant: LG Energy Solution, Ltd., Seoul (KR)

(72) Inventors: In-Sung Uhm, Daejeon (KR);
Yong-Hee Kang, Daejeon (KR);
Byoung-Hyo Jung, Daejeon (KR);
Min-Chul Jang, Daejeon (KR);
Jung-Hun Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 620 days.

(21) Appl. No.: 17/776,065

(22) PCT Filed: Nov. 20, 2020

(86) PCT No.: PCT/KR2020/016534
§ 371 (c)(1),
(2) Date: May 11, 2022

(87) PCT Pub. No.: WO2021/101343
PCT Pub. Date: May 27, 2021

(65) Prior Publication Data
US 2022/0393274 A1  Dec. 8, 2022

(30) Foreign Application Priority Data

Nov. 22, 2019  (KR) .................. 10-2019-0151647

(51) Int. Cl.
*H01M 50/121* (2021.01)
*H01M 50/105* (2021.01)
(Continued)

(52) U.S. Cl.
CPC ....... *H01M 50/121* (2021.01); *H01M 50/105* (2021.01); *H01M 50/122* (2021.01);
(Continued)

(58) Field of Classification Search
CPC .................................................. H01M 50/121
See application file for complete search history.

(56) References Cited

U.S. PATENT DOCUMENTS

| 10,964,924 B2 | 3/2021 | Uhm et al. |
| 2014/0272350 A1 | 9/2014 | Kim et al. |

(Continued)

FOREIGN PATENT DOCUMENTS

| CN | 103825007 A | 5/2014 |
| CN | 105229817 A | 1/2016 |

(Continued)

OTHER PUBLICATIONS

Georgakilas, V. et al., "Functionalization of Graphene: Covalent and Non-Covalent Approaches, Derivatives and Applications" ACS Publications, Nov. 2012, vol. 112, No. 11, pp. 6156-6214.
(Continued)

*Primary Examiner* — Maria Laios
*Assistant Examiner* — Jordan E Berresford
(74) *Attorney, Agent, or Firm* — Lerner David LLP

(57) ABSTRACT

Disclosed is a packaging for a flexible secondary battery comprising a first polymer resin layer, a barrier layer formed on the first polymer resin layer to block water and gas, and a second polymer resin layer formed on the barrier layer. The thickness of the barrier layer is 30 to 999 nm. The barrier layer is multi-layered, and comprises graphene, a dispersing agent, and pyrene as a flexible linking agent, in which there is π-π conjugation (interaction) between the graphene and the pyrene. Also disclosed is a flexible secondary battery comprising the packaging.

10 Claims, 3 Drawing Sheets

(51) Int. Cl.
  *H01M 50/122* (2021.01)
  *H01M 50/129* (2021.01)
  *H01M 50/133* (2021.01)
  *H01M 50/136* (2021.01)

(52) U.S. Cl.
  CPC ....... *H01M 50/129* (2021.01); *H01M 50/133* (2021.01); *H01M 50/136* (2021.01)

(56) References Cited

U.S. PATENT DOCUMENTS

| | | |
|---|---|---|
| 2015/0129280 A1 | 5/2015 | Lee et al. |
| 2016/0329533 A1 | 11/2016 | Tajima |
| 2016/0372717 A1 | 12/2016 | Noda |
| 2018/0080897 A1 | 3/2018 | Miyamoto et al. |
| 2018/0205043 A1 | 7/2018 | Kwon et al. |
| 2020/0099019 A1 | 3/2020 | Li et al. |
| 2021/0005853 A1 | 1/2021 | Tajima |

FOREIGN PATENT DOCUMENTS

| | | | |
|---|---|---|---|
| CN | 106159009 | A | 11/2016 |
| EP | 2999022 | A1 | 3/2016 |
| JP | 2016213190 | A | 12/2016 |
| JP | 2017010932 | A | 1/2017 |
| JP | 2017500398 | A | 1/2017 |
| JP | 2018048822 | A | 3/2018 |
| KR | 20120001148 | A | 1/2012 |
| KR | 20130037329 | A | 4/2013 |
| KR | 20130047804 | A | 5/2013 |
| KR | 101325530 | B1 | 11/2013 |
| KR | 2014-0015926 | A | 2/2014 |
| KR | 20140015927 | A | 2/2014 |
| KR | 20140094960 | A | 7/2014 |
| KR | 20150004097 | A | 1/2015 |
| KR | 20160005578 | A | 1/2016 |
| KR | 20160029717 | A | 3/2016 |
| KR | 2016-0058570 | A | 5/2016 |
| KR | 20170028111 | A | 3/2017 |
| KR | 20190032024 | A | 3/2019 |
| KR | 20190041843 | A | 4/2019 |
| KR | 20190086006 | A | 7/2019 |
| KR | 20190114914 | A | 10/2019 |
| WO | 2015089026 | A1 | 6/2015 |

OTHER PUBLICATIONS

Extended European Search Report for Application No. 20889804.9 dated Feb. 3, 2023, pp. 1-5.
Hong Ni et al., "Robust Bioinspired Graphene Film via π-π Cross-linking", ACS Appl. Mater. Interfaces Jul. 2017. pp. 24987-24992.
International Search Report for Application No. PCT/KR2020/016534 mailed Feb. 25, 2021, pp. 1-3.

PACKAGING FOR FLEXIBLE SECONDARY BATTERY, AND FLEXIBLE SECONDARY BATTERY COMPRISING SAME

CROSS-REFERENCE TO RELATED APPLICATIONS

This application is a national phase entry under 35 U.S.C. § 371 of International Application No. PCT/KR2020/016534, filed on Nov. 20, 2020, which claims the benefit of Korean Patent Application No. 10-2019-0151647, filed on Nov. 22, 2019, with the Korean Intellectual Property Office, the disclosures of which are incorporated herein by reference in their entirety.

TECHNICAL FIELD

The present disclosure relates to a packaging for a flexible secondary battery and a flexible secondary battery comprising the same, and more particularly, to a packaging for a flexible secondary battery for preventing cracks from occurring due to tensile stress and compressive stress in a repeated bending environment and a flexible secondary battery comprising the same.

BACKGROUND ART

With the technology development and the increasing demand of mobile devices, there is a dramatic increase in the demand for secondary batteries as a source of energy, and among secondary batteries, lithium secondary batteries having high energy density and discharge voltage have been studied so much and are now widely used.

A secondary battery is largely classified into a cylindrical battery, a prismatic battery and a pouch-type battery according to the shape of a battery case in which an electrode assembly of positive electrode/separator/negative electrode is received, and keeping up with the trend towards size minimization of devices, there is a significant increase in the demand for prismatic batteries and pouch-type batteries that are suitable for small devices.

In general, a prismatic battery is fabricated by putting a jelly-roll or stack type electrode assembly of positive electrode/separator/negative electrode in a metal prismatic battery case, covering an open top with a top cap, injecting an electrolyte solution through an electrolyte injection port on the top cap and sealing.

Additionally, the pouch-type battery is fabricated by sealing the outer periphery of a pouch case of a laminate sheet, in which an electrode assembly is received, by heat welding.

Meanwhile, with the diversity of devices using batteries, batteries are fabricated in various shapes other than the cuboidal shape.

For example, smart phones may have rounded sides for improved grip, and when flexible displays are applied, they are bendable or foldable, and accordingly many studied have been made on rounded batteries or flexible batteries.

A packaging for protecting the flexible battery requires both flexibility and water barrier properties. When a tube packaging made of general polymer is used, water or air is infiltrated through micropores of the polymer and contaminates the electrolyte in the battery, resulting in battery performance degradation.

To overcome the problem, a packaging made of a metal foil may be used, but due the stiffness of the metal foil, when bending the battery, the battery is not completely bent, and the surface of the metal foil is folded or wrinkled, and eventually, the metal foil may be torn off.

DISCLOSURE

Technical Problem

The present disclosure is directed to providing a packaging for a flexible secondary battery for providing stability without breakdown in a repeated bending environment, and preventing cracks from occurring due to tensile stress and compressive stress and a flexible secondary battery comprising the same.

Technical Solution

According to an aspect of the present disclosure, there is provided a packaging for a flexible secondary battery of the following embodiments.

According to a first embodiment, there is provided a packaging for a flexible secondary battery comprising a first polymer resin layer, a barrier layer formed on the first polymer resin layer, wherein the barrier layer blocks water and gas, is 30 to 999 nm in thickness, is multi-layered, and comprises graphene, a dispersing agent, and pyrene as a flexible linking agent, in which there is $\pi$-$\pi$ conjugation (interaction) between the graphene and the pyrene, and a second polymer resin layer formed on the barrier layer.

According to a second embodiment, in the first embodiment, the first polymer resin layer may include polyolefin-based resin, polyester-based resin, polyamide-based resin, polyethyleneimine-based resin, polyether-based resin, cyanoacrylate-based resin, organ titanium-based resin, polyurethane-based resin, polyetherurethane-based resin, epoxy-based resin, imide-based resin, isocyanate-based resin, silicone-based resin or at least two of them.

According to a third embodiment, in the first or second embodiment, an amount of the dispersing agent may be 0.01 to 1 part by weight, and an amount of the pyrene may be 0.1 to 2 parts by weight, based on 100 parts by weight of the graphene.

According to a fourth embodiment, in any one of the first to third embodiments, the graphene may be a defect free graphene.

According to a fifth embodiment, in any one of the first to fourth embodiments, the dispersing agent may be $C_nH_{2n+1}R$ where R is $NH_3$, OH, or COOH, $20 \leq n \leq 30$.

According to a sixth embodiment, in any one of the first to fifth embodiments, the barrier layer may be 30 nm to 900 nm in thickness.

According to a seventh embodiment, in any one of the first to sixth embodiments, the barrier layer may be triple- to quintuple-layered.

According to an eighth embodiment, in any one of the first to seventh embodiments, the second polymer resin layer may include polyolefin-based resin, polyester-based resin, polyamide-based resin, polyethyleneimine-based resin, polyether-based resin, cyanoacrylate-based resin, organ titanium-based resin, polyurethane-based resin, polyetherurethane-based resin, epoxy-based resin, imide-based resin, isocyanate-based resin, silicone-based resin or at least two of them.

According to a ninth embodiment, in any one of the first to eighth embodiments, an adhesive layer may be further formed on at least one of a contact surface between the barrier layer and the first polymer resin layer or a contact surface between the barrier layer and the second polymer resin layer.

According to a tenth embodiment, there is provided a flexible secondary battery comprising a flexible electrode assembly and a packaging in which the flexible electrode assembly is embedded, wherein the packaging is the packaging for a flexible secondary battery according to any one of the first to ninth embodiments.

Advantageous Effects

According to an embodiment of the present disclosure, the packaging for a flexible secondary battery includes the barrier layer to block water and gas to prevent the contamination of the electrolyte in the flexible secondary battery, thereby preventing the battery performance degradation and maintaining the mechanical strength of the flexible secondary battery.

Additionally, in addition to graphene, the barrier layer of the packaging for a flexible secondary battery further includes a dispersing agent and pyrene, to increase the mechanical strength of the barrier layer and improve the dispersion of graphene in the barrier layer and flexibility in the coating layer, thereby further enhancing the water barrier and flexibility of the flexible secondary battery.

BRIEF DESCRIPTION OF THE DRAWINGS

The accompanying drawings illustrate preferred embodiments of the present disclosure, and together with the detailed disclosure, serve to help the understanding of the technical aspect of the present disclosure, and thus the present disclosure should not be interpreted as being limited to the drawings.

DETAILED DESCRIPTION

Figure 1:
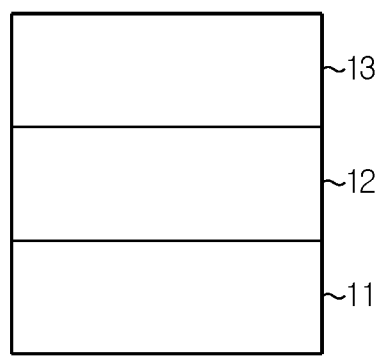
FIG. 1 is a diagram schematically showing a cross section of a packaging for a flexible secondary battery according to an embodiment of the present disclosure.

Hereinafter, the present disclosure will be described in detail with reference to the accompanying drawings. It should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation. Therefore, the embodiments described herein and the illustrations in the drawings are just a most preferred embodiment of the present disclosure, but not intended to fully describe the technical aspects of the present disclosure, so it should be understood that a variety of other equivalents and variations could have been made thereto at the time that the application was filed.

A packaging for a flexible secondary battery according to an aspect of the present disclosure comprises:
a first polymer resin layer;
a barrier layer formed on the first polymer resin layer, wherein the barrier layer blocks water and gas, is 30 to 999 nm in thickness, is multi-layered, and comprises graphene, a dispersing agent, and pyrene as a flexible linking agent, in which there is π-π conjugation (interaction) between the graphene and the pyrene; and
a second polymer resin layer formed on the barrier layer.

FIG. 1 is a diagram schematically showing a cross section of a packaging for a flexible secondary battery according to an embodiment of the present disclosure.

Referring to FIG. 1, the packaging 10 for a flexible secondary battery according to an embodiment of the present disclosure may include a first polymer resin layer 11; a barrier layer 12 formed on the first polymer resin layer 11; and a second polymer resin layer 13 formed on the barrier layer 12.

The packaging 10 for a flexible secondary battery includes the barrier layer 12 to block water and gas to prevent the contamination of the electrolyte in the flexible secondary battery, preventing the battery performance degradation, and maintaining the mechanical strength of the flexible secondary battery.

In particular, in addition to the graphene, the battier layer 12 further includes the dispersing agent and the pyrene, to increase the mechanical strength of the barrier layer, and improve the dispersion of graphene in the barrier layer and flexibility in the coating layer, thereby further enhancing the water barrier and flexibility of the flexible secondary battery.

Conventionally, PET or nylon as a protection layer for preventing cracks in the barrier layer is attached to one surface of the barrier layer, but it was difficult to prevent stress-induced cracks in repeated bending situations, resulting in degraded battery performance caused by water infiltration.

However, to solve the problem, the present disclosure includes graphene and pyrene in the barrier layer.

The graphene included in the barrier layer refers to carbon atoms linked via covalent bonds to form polycyclic aromatic molecules, and the carbon atoms linked via covalent bonds form 6-membered rings as basic repeat units, and may further include 5-membered rings and/or 7-membered rings.

According to an embodiment of the present disclosure, the graphene may be a defect free graphene. In this instance, defect free graphene exhibits less defects than graphene oxide due to having no oxygen bonds, and has π-π conjugation continuity without break (without SP3 connect). The graphene has π orbitals in the hexagonal structure, and the π-π conjugation is found in the π orbitals (with Sp2 connect).

Additionally, the pyrene is a polycyclic aromatic hydrocarbon (PAH) among aromatic hydrocarbons and is a compound of chemical formula of $C_{16}H_{10}$, having a criss-cross array of benzene rings. Accordingly, the pyrene of the present disclosure is an unsubstituted pyrene compound in which a certain hydrogen atom is not substituted by a different group, and for example, the pyrene of the present disclosure is completely different from pyrene derivatives in which at least one of hydrogen atoms of the pyrene is substituted by an amino group, a carboxylic acid group and a butyric acid group. The pyrene has the π-π conjugation, so the π-π conjugation may occur between the pyrene and the graphene. Accordingly, the pyrene acts as a bridge between graphene. In the case of the pyrene derivatives having chemical group substitution such as the amino group, carboxylic acid group and butyric acid group, the π-π conjugation between the pyrene and the graphene is interfered due to the steric hindrance by the substituted group (substituent), and when the substituent is hydrophilic, the water barrier properties may notably become poor.

The barrier layer of the present disclosure has π-π interaction between the graphene and the pyrene, thereby improving the water barrier capability and flexibility.

Additionally, in addition to the graphene and the pyrene, the barrier layer of the present disclosure further includes the dispersing agent. The dispersing agent is added to a composition for a barrier layer including graphene, pyrene and a dispersion medium to form the barrier layer, thereby further improving the dispersion of graphene in the composition for a barrier layer, and as a result, the barrier layer obtained through the composition for a barrier layer may have a uniform thickness and improved flexibility.

According to an embodiment of the present disclosure, the dispersing agent may be a carboxyl acid-based dispersing agent, an amine-based dispersing agent, or a hydroxy alcohol-based dispersing agent represented by the chemical formula $C_nH_{2n+1}R$ (R is $NH_3$, OH, or COOH, $20 \leq n \leq 30$). Additionally, another example of the dispersing agent includes a sulfonate-based dispersing agent such as dodecyl benzene sulfonate, short tail alkyl-benzene sulfonate, lignosulfonate, sulfo-carboxyl compounds, and a sulfate-based dispersing agent such as alkyl sulfate, alkyl-ester sulfate, alkanolamide sulfate, glyceride sulfate, and other anionic surfactant such as organic phosphoric acid-based surfactant, sarcoside or alkyl amino acid.

Here, the thickness of the barrier layer may be 30 to 999 nm, and according to an embodiment of the present disclosure, the thickness of the barrier layer may be 30 to 900 nm, or 100 to 900 nm, or 600 to 900 nm, or 100 nm to 600 nm, or 100 nm to 500 nm, or 200 nm to 400 nm.

When the thickness of the barrier layer exceeds 999 nm, cracks caused by external stimuli occur, and when the thickness of the barrier layer is less than 30 nm, it is impossible to block water as the barrier layer.

Additionally, the barrier layer of the present disclosure may be multi-layered, and for example, double-, triple- to quintuple-layered.

As opposed to the single layered barrier layer including the graphene, the pyrene and the dispersing agent, the multi-layered barrier layer of the present disclosure has much improved flexibility.

According to an embodiment of the present disclosure, the amount of dispersing agent may be 0.01 to 1 part by weight, or 0.1 to 0.5 parts by weight based on 100 parts by weight of the graphene.

When the amount of dispersing agent satisfies the above-described range, the dispersion of graphene may be improved, thereby ensuring thickness uniformity, and with the increasing amount of dispersing agent, defects may occur, and thus the amount of dispersing agent is minimized to maintain the water barrier properties.

Additionally, the amount of pyrene may be 0.1 to 2 parts by weight, or 0.5 to 1 part by weight based on 100 parts by weight of the graphene.

When the amount of pyrene satisfies the above-described range, the water barrier properties may be improved by the π-π conjugation linkers between graphene layers.

The first polymer resin layer according to an embodiment of the present disclosure may be attached to the electrode assembly received in the packaging, and may include polyolefin-based resin, polyester-based resin, polyamide-based resin, polyethyleneimine-based resin, polyether-based resin, cyanoacrylate-based resin, organ titanium-based resin, polyurethane-based resin, polyetherurethane-based resin, epoxy-based resin, imide-based resin, isocyanate-based resin, silicone-based resin or at least two of them, and preferably, casted polypropylene (CPP).

In this instance, the first polymer resin layer may serve as a heat-shrink tube layer. The heat-shrink tube is a tube that when heated, shrinks to wrap tightly around materials having different ends, shapes or sizes, and the heat-shrink tube is usually made of polymer resin and used for the purpose of insulation or other uses. There commercially available heat-shrink tubes having different materials and shapes, and suitable ones may be easily obtained and used for the purpose of the present disclosure. In this instance, heat shrinking is performed at low temperature to avoid thermal damage of the secondary battery, and in general, it is necessary to complete heat shrinking at 70° C. to 200° C. or 70° C. to 120° C.

Additionally, the thickness of the first polymer resin layer may be 15 to 500 μm, or 20 to 60 μm. When the thickness of the first polymer resin layer satisfies the above-described range, it is possible to maintain the adhesive strength as a sealing material, and prevent the energy density from reducing with the increasing capacity per volume of the battery.

Meanwhile, the second polymer resin layer may include, as a material for preventing cracks in the barrier layer 120, polyolefin-based resin, polyester-based resin, polyamide-based resin, polyethyleneimine-based resin, polyether-based resin, cyanoacrylate-based resin, organ titanium-based resin, polyurethane-based resin, polyetherurethane-based resin, epoxy-based resin, imide-based resin, isocyanate-based resin, silicone-based resin or at least two of them, and preferably, nylon resin or PET.

Additionally, the thickness of the second polymer resin layer may be 5 to 50 μm, or 10 to 30 μm. The second polymer resin layer plays a role in protecting the exterior of the packaging material or maintaining the shape of the battery by elastic recovery when deformed, and when the thickness of the second polymer resin layer satisfies the above-described range, it is possible to keep it stiff and prevent the reduction in capacity per volume of the battery.

Meanwhile, the barrier layer according to an embodiment of the present disclosure may further include an adhesive layer on the contact surface between the first polymer resin layer and the barrier layer or between the second polymer resin layer and the barrier layer, to further improve the adhesion between the first and second polymer resin layers and the barrier layer.

The adhesive layer may be formed using a commonly used adhesive, and for example, the adhesive layer may be formed by coating a polyacrylate-based adhesive by casting.

Additionally, the barrier layer of the present disclosure may be multi-layered, and according to an embodiment of the present disclosure, the adhesive layer may be interposed between the multiple barrier layers. When the adhesive layer is formed between the multiple barrier layers, the adhesion between the barrier layers may be further improved and it is good to maintain the water barrier properties. For an embodiment in which the adhesive layer is formed between the multiple barrier layers, a reference may be made to FIGS. 1 and 2 as below.

The outstanding water barrier properties of the packaging for a flexible secondary battery can be seen in a change in water vapor transmission rate before and after 5R bending test performed repeatedly 100 times. The change in water vapor transmission rate of the packaging for a flexible secondary battery before and after the 5R bending test performed repeatedly 100 times may be 1 to 15%, or 5 to 15%, or 5.6 to 14.8%, or 5.6 to 9.2%.

In this instance, the 5R bending test is performed by bending and stretching the packaging for a flexible secondary battery using a bar of a circular cross section having the radius of 5 mm along the circumference of the bar a predetermined times, where a cycle of bending and stretching once is counted as one.

The change in water vapor transmission rate is calculated as the following equation.

Change in water vapor transmission rate (%)=[(water vapor transmission rate after bending−water vapor transmission rate before bending)/(water vapor transmission rate before bending)]×100

Meanwhile, a flexible secondary battery according to another aspect of the present disclosure includes a flexible electrode assembly and a packaging in which the flexible electrode assembly is received, wherein the packaging is the above-described packaging for a flexible secondary battery according to the present disclosure.

In an embodiment of the present disclosure, the flexible electrode assembly may include a positive electrode and a negative electrode with a separator interposed between. In this instance, the flexible electrode assembly may have a structure in which one positive electrode and one negative electrode are wound with the separator interposed between, or multiple positive electrodes and multiple negative electrodes are stacked with the separator interposed between. Additionally, the flexible electrode assembly may include an inner electrode, a separator and an outer electrode.

Hereinafter, examples are provided to describe the present disclosure in detail. However, the examples according to the present disclosure may be modified in many different forms, and the scope of the present disclosure should not be interpreted as being limited to the following examples. The examples of the present disclosure provide a thorough and complete description of present disclosure to those having ordinary skill in the art.

Example 1

(1) Preparation of Defect Free Graphene and a Composition for a Barrier Layer Including the Same Graphite powder underwent liquid phase exfoliation.

In this instance, a dispersion medium may include N-methylpyrrolidone (NMP), orthodichlorobenzene and dimethylformamide, and commercially available NMP is preferred.

A dispersion solution of 1 weight % of graphite powder in N-methylpyrrolidone (NMP) was sonicated at 60° C. with the energy of 120 W for 5 hours. In this instance, the temperature was uniformly maintained at 60° C. using a thermal controller and a cooling coil.

Subsequently, to maintain the uniform dispersion solution, 0.13 parts by weight of $C_{20}H_{41}COOH$ as a dispersing agent was added based on 100 parts by weight of graphene. Additionally, to improve the flexibility of the graphene layer, 0.1 parts by weight of pyrene as a linking agent was added based on 100 parts by weight of graphene, and stirred in a centrifuge at 5,000 rpm for 30 min. As a result, a composition for a barrier layer including the defect free graphene obtained by the liquid phase exfoliation of the graphite powder, the pyrene, the dispersing agent, and the dispersion medium was obtained.

(2) Preparation of a Packaging for a Flexible Secondary Battery

Figure 2:
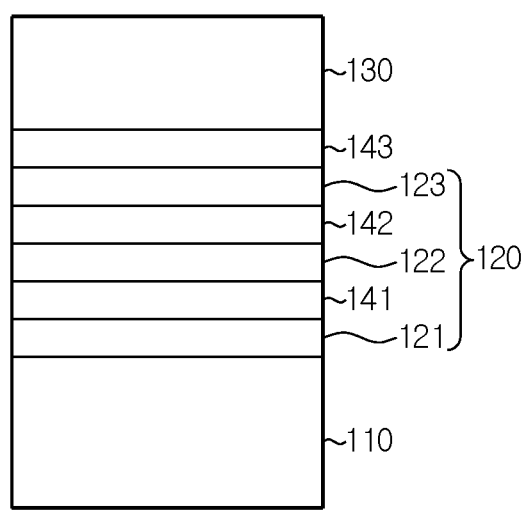
FIG. 2 is a diagram schematically showing a cross section of a packaging for a flexible secondary battery according to example 1 of the present disclosure.

FIG. 2 is a diagram schematically showing a cross section of a packaging for a flexible secondary battery according to example 1 of the present disclosure.

Referring to FIG. 2, a 20 μm thick casted polypropylene (CPP) film 110 was prepared as a first polymer resin layer, the previously prepared composition for a barrier layer was coated on the casted polypropylene (CPP) film using a doctor blade, dried by heating at 90° C. for 10 min to form a 300 nm thick first barrier layer 121. A 3.5 μm thick polyacrylate-based adhesive was coated on the first barrier layer by the casting method to form an adhesive layer 141, the previously prepared composition for a barrier layer was coated using a doctor blade and dried by heating at 90° C. for 10 min to form a 300 nm thick second barrier layer 122, a 3.5 μm thick polyacrylate-based adhesive was coated on the second barrier layer by the casting method in the same way to form an adhesive layer 142, and the previously prepared composition for a barrier layer was coated using a doctor blade and dried by heating at 90° C. for 10 min to form a 300 nm thick third barrier layer 123.

Subsequently, a 3.5 μm thick polyacrylate-based adhesive was coated on the third barrier layer by the casting method to form an adhesive layer 143, and a 23 μm thick nylon film 130 was attached as a second polymer resin layer 130 to prepare a packaging 100 for a flexible secondary battery having a triple layered barrier layer 120.

Example 2

Figure 3:
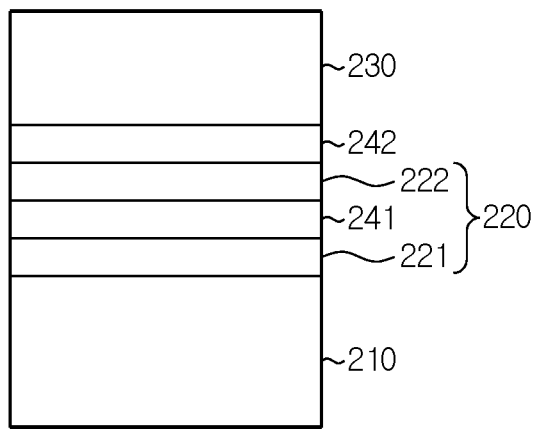
FIG. 3 is a diagram schematically showing a cross section of a packaging for a flexible secondary battery according to example 2 of the present disclosure.

FIG. 3 is a diagram schematically showing a cross section of a packaging for a flexible secondary battery according to example 2 of the present disclosure.

Referring to FIG. 3, a 20 μm thick casted polypropylene (CPP) film 210 was prepared as a first polymer resin layer, and the composition for a barrier layer previously prepared in example 1 was coated on the casted polypropylene (CPP) film using a doctor blade and dried by heating at 90° C. for 10 min to form a 300 nm thick first barrier layer 221. A 3.5 μm thick polyacrylate-based adhesive was coated on the first barrier layer by the casting method for form an adhesive layer 241, and the previously prepared composition for a barrier layer was coated and dried by heating at 90° C. for 10 min to form a 300 nm thick second barrier layer 222.

Subsequently, a 3.5 μm thick polyacrylate-based adhesive was coated on the second barrier layer by the casting method to form an adhesive layer 242, and a 23 μm thick nylon film 230 was attached as a second polymer resin layer 230 to prepare a packaging 200 for a flexible secondary battery having a double layered barrier layer 220.

Comparative Example 1

Figure 4:
FIG. 4 is a diagram schematically showing a cross section of a packaging for a flexible secondary battery according to comparative example 1.

FIG. 4 is a diagram schematically showing a cross section of a packaging for a flexible secondary battery according to comparative example 1.

Referring to FIG. 4, a 20 μm thick casted polypropylene (CPP) film 310 was prepared as a first polymer resin layer, a 3.5 μm thick polyacrylate-based adhesive was coated on the casted polypropylene (CPP) film by the casting method to form an adhesive layer 341, and the previously prepared composition for a barrier layer was coated using a doctor blade and dried by heating at 90° C. for 10 min to form a 300 nm thick barrier layer 320.

Subsequently, a 3.5 μm thick polyacrylate-based adhesive was coated on the barrier layer by the casting method to form an adhesive layer 342, and a 23 μm thick nylon film 330 was attached as a second polymer resin layer 330 to prepare a packaging 300 for a flexible secondary battery having a single layered barrier layer 320.

Comparative Example 2

Figure 5:
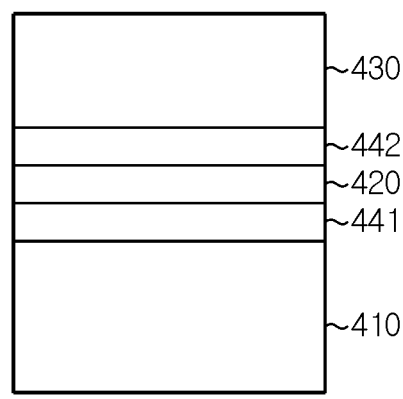
FIG. 5 is a diagram schematically showing a cross section of a packaging for a flexible secondary battery according to comparative example 2.

FIG. 5 is a diagram schematically showing a cross section of a packaging for a flexible secondary battery according to comparative example 2.

Referring to FIG. 5, a 20 μm thick casted polypropylene (CPP) film 410 was prepared as a first polymer resin layer, a 3.5 μm thick polyacrylate-based adhesive was coated on the casted polypropylene (CPP) film by the casting method to form an adhesive layer 441, and the previously prepared composition for a barrier layer was coated using a doctor blade and dried by heating at 90° C. for 10 min to form a 3 μm thick barrier layer 420.

Subsequently, a 3.5 μm thick polyacrylate-based adhesive was coated on the barrier layer by the casting method to form an adhesive layer 442, and a 23 μm thick nylon film 430 was attached as a second polymer resin layer 430 to prepare a packaging 400 for a flexible secondary battery having a single layered barrier layer 420.

Comparative Example 3

Figure 6:
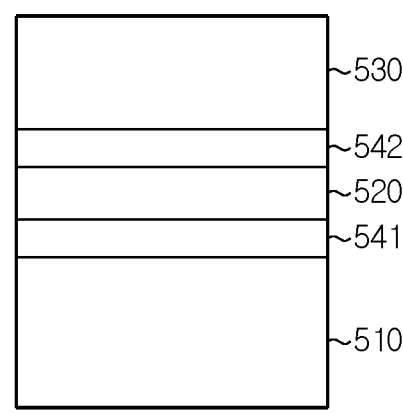
FIG. 6 is a diagram schematically showing a cross section of a packaging for a flexible secondary battery according to comparative example 3.

FIG. 6 is a diagram schematically showing a cross section of a packaging for a flexible secondary battery according to comparative example 3.

Referring to FIG. 6, a 20 μm thick casted polypropylene (CPP) film 510 was prepared as a first polymer resin layer, a 3.5 μm thick polyacrylate-based adhesive was coated on the casted polypropylene (CPP) film by the casting method to form an adhesive layer 541, and a 15 μm thick aluminum (Al) foil was attached to the adhesive layer to form a barrier layer 520. Subsequently, a 3.5 μm thick polyacrylate-based adhesive was coated on the barrier layer by the casting method to form an adhesive layer 542, and a 23 μm thick nylon film was attached as a second polymer resin layer 530 to prepare a packaging 500 for a flexible secondary battery having a single layered barrier layer 520.

Comparative Example 4

(1) Preparation of a Composition for a Barrier Layer

A dispersion solution of 1 weight % of graphite powder in N-methylpyrrolidone (NMP) was sonicated at 60° C. with the energy of 120 W for 5 hours to obtain graphene. In this instance, the temperature was uniformly maintained at 60° C. using a thermal controller and a cooling coil.

20 mg of the obtained graphene was dispersed in 20 ml of pyridine, and pyrene butyric acid (PBA) dispersed in 20 ml of pyridine was sonicated for 1 hour. Subsequently, the two solutions were mixed together and sonicated at 70° C. for 12 hours, followed by reaction for 24 hours. After the reaction was completed, cooling was performed to reduce to the room temperature, followed by filtering using a vacuum filter, and washing to remove remaining salts. To completely remove water, drying was performed at 100° C. for 24 hours to obtain graphene surface modified with a pyrene butyric acid derived carboxyl group.

Subsequently, 99.8 parts by weight of graphene surface modified with a carboxyl group and 0.2 parts by weight of $C_{20}H_{41}COOH$ as a dispersing agent were mixed, and stirred in a centrifuge at 5,000 rpm for 30 min. As a result, a composition for a barrier layer including the graphene surface modified with a carboxyl group, the dispersing agent and the dispersion medium was obtained.

(2) Preparation of a Packaging for a Flexible Secondary Battery

A packaging for a flexible secondary battery is prepared by the same method as example 1, except that the obtained composition for a barrier layer is used.

Evaluation of Properties

Evaluation of Water Vapor Transmission Rate (WVTR) Before and After Bending (1) Evaluation of Water Vapor Transmission Rate Before Bending The packaging for a flexible secondary battery of each of examples 1 to 2 and comparative examples 1 to 4 was tailored to the size of 108 mm×108 mm, and mounted in a water vapor transmission rate tester (manufacturer: Sejin Test, model name: SJTM-014). Subsequently, dry nitrogen gas containing no water vapor was fed to one surface of the packaging for a flexible secondary battery, and water vapor was fed to the other surface. In this instance, to prevent the gases fed to the two surfaces of the packaging for a flexible secondary battery from being mixed together, two spaces into which the gases were fed were separated from each other. Meanwhile, during the experiment, the temperature was set to 38° C. and the humidity to 100% RH and they were maintained. Additionally, for 24 hours, the amount of water vapor was measured on the surface to which dry nitrogen gas was fed using a humidity sensor. The amount of water vapor per unit area passing through a pouch film for 24 hours was calculated by dividing the amount of water vapor by the area of one surface, and evaluated as water vapor transmission rate (WVRT). The result is shown in Table 1.

(2) Evaluation of Water Vapor Transmission Rate after Bending

For the packaging for a flexible secondary battery of each of examples 1 to 2 and comparative examples 1 to 4, a 5R bending test was performed repeatedly 100 times, and the water vapor transmission rate was evaluated under the above-described condition. The result is shown in Table 1. Here, the 5R bending test was performed by bending and stretching the packaging for a flexible secondary battery using a bar of a circular cross section having the radius of 5 mm along the circumstance of the bar a predetermined times, where a cycle of bending and stretching once was counted as one.

(3) Change in Water Vapor Transmission Rate

The change in water vapor transmission rate was calculated by the following equation and shown in Table 1.

Change in water vapor transmission rate (%)=[(water vapor transmission rate after bending−water vapor transmission rate before bending)/(water vapor transmission rate before bending)]×100

TABLE 1

| | Example 1 | Example 2 | Comparative example 1 | Comparative example 2 | Comparative example 3 | Comparative example 4 |
|---|---|---|---|---|---|---|
| Water vapor transmission rate before bending (g/m²·day) | $3.06 \times 10^{-3}$ | $8.28 \times 10^{-3}$ | $2.82 \times 10^{-2}$ | $2.13 \times 10^{-3}$ | $1.26 \times 10^{-3}$ | $6.5 \times 10^{-2}$ |
| Water vapor transmission rate after bending (g/m²·day) | $4.28 \times 10^{-3}$ | $1.6 \times 10^{-3}$ | $7.2 \times 10^{-2}$ | $6.28 \times 10^{1}$ | $6.1 \times 10^{-3}$ | $1.4 \times 10^{0}$ |
| Change in water vapor transmission rate (%) | 39 | 93 | 155 | > a few thousand % | 384 | > a few thousand % |

Referring to the above Table 1, it can be seen that compared to the packaging for a flexible secondary battery of Comparative Examples 1 to 4, the packaging for a flexible secondary battery according to Examples 1 and 2, having the multi-layered barrier layer including the graphene, the dispersing agent and the pyrene as the flexible linking agent in which there was the π-π conjugation (interaction) between the graphene and the pyrene had significant reductions in the change in water vapor transmission rate after bending to water vapor transmission rate before bending.

In this instance, in the case of Comparative Example 4, since the barrier layer included the graphene surface-modified with a pyrene butyric acid derived carboxyl group, the hydrophilicity of graphene rose due to the butyric acid, and the π-π conjugation between the graphene and the pyrene was interfered by the 3-dimensional shape, and thus there was a significant reduction in the change in water vapor transmission rate after bending to water vapor transmission rate before bending.

While the present disclosure has been hereinabove described, this is provided to describe the technical aspects by way of illustration, and those skilled in the art will appreciate that a variety of modifications and changes may be made thereto without departing from the essential features of the present disclosure. Accordingly, the embodiments disclosed herein are provided to describe the technical aspects of the present disclosure, but not intended to limit the technical aspects of the present disclosure, and the scope of the technical aspects of the present disclosure is not limited thereto. The scope of protection of the present disclosure should be interpreted by the appended claims, and all the technical aspects in the equivalent scope should be interpreted as residing in the scope of protection of the present disclosure.

DESCRIPTION OF REFERENCE NUMERAL 10, 100, 200, 300, 400, 500: packaging 11, 110, 210, 310, 410, 510: first polymer resin layer 12, 120, 220, 320, 420, 520: barrier layer 121, 221: first barrier layer, 122, 222: second barrier layer, 123: third barrier layer 13, 130, 230, 330, 430, 530: second polymer resin layer 141, 142, 143, 241, 242, 341, 342, 441, 442, 541, 542: adhesive layer

What is claimed is:

1. A packaging for a flexible secondary battery, comprising:
   a first polymer resin layer;
   a barrier layer formed on the first polymer resin layer to block water and gas; and
   a second polymer resin layer formed on the barrier layer,
   wherein the barrier layer is multi-layered, and comprises graphene, a dispersing agent, and pyrene as a flexible linking agent, in which there is π-π conjugation between the graphene and the pyrene;
   wherein a thickness of the barrier layer is 30 to 999 nm.

2. The packaging for a flexible secondary battery according to claim 1, wherein the first polymer resin layer includes polyolefin-based resin, polyester-based resin, polyamide-based resin, polyethyleneimine-based resin, polyether-based resin, cyanoacrylate-based resin, organ titanium-based resin, polyurethane-based resin, polyetherurethane-based resin, epoxy-based resin, imide-based resin, isocyanate-based resin, or silicone-based resin or at least two of them.

3. The packaging for a flexible secondary battery according to claim 1, wherein an amount of the dispersing agent is from 0.01 to 1 part by weight, and an amount of the pyrene is from 0.1 to 2 parts by weight, based on 100 parts by weight of the graphene.

4. The packaging for a flexible secondary battery according to claim 1, wherein the graphene is a defect free graphene.

5. The packaging for a flexible secondary battery according to claim 1, wherein the dispersing agent is $C_nH_{2n+1}R$ wherein R is $NH_3$, OH, or COOH, 20≤n≤30.

6. The packaging for a flexible secondary battery according to claim 1, wherein the thickness of the barrier layer is 30 nm to 900 nm.

7. The packaging for a flexible secondary battery according to claim 1, wherein the barrier layer is triple- to quintuple-layered.

8. The packaging for a flexible secondary battery according to claim 1, wherein the second polymer resin layer includes polyolefin-based resin, polyester-based resin, polyamide-based resin, polyethyleneimine-based resin, polyether-based resin, cyanoacrylate-based resin, organ titanium-based resin, polyurethane-based resin, polyetherurethane-based resin, epoxy-based resin, imide-based resin, isocyanate-based resin, or silicone-based resin or at least two of them.

9. The packaging for a flexible secondary battery according to claim 1, further comprising an adhesive layer formed on at least one of a contact surface between the barrier layer and the first polymer resin layer or a contact surface between the barrier layer and the second polymer resin layer.

10. A flexible secondary battery comprising a flexible electrode assembly and the packaging according to claim 1 in which the flexible electrode assembly is embedded.

\* \* \* \* \*